United States Patent [19]

Fujibayashi

[11] 4,338,529
[45] Jul. 6, 1982

[54] CUE SIGNAL GENERATING CIRCUIT

[75] Inventor: Kenji Fujibayashi, Tokyo, Japan

[73] Assignee: Olympus Optical Co., Ltd., Tokyo, Japan

[21] Appl. No.: 143,420

[22] Filed: Apr. 24, 1980

[30] Foreign Application Priority Data

May 9, 1979 [JP] Japan ................................. 54-56449

[51] Int. Cl.³ .................... H03K 21/00; H03K 5/13
[52] U.S. Cl. ............................. 307/518; 307/225 R; 360/72.2
[58] Field of Search ............ 307/518, 592, 597, 225 R; 328/108, 110, 119; 360/72.2

[56] References Cited

U.S. PATENT DOCUMENTS

| Re. 26,079 | 9/1966 | Cooper | 307/225 |
|---|---|---|---|
| 2,396,409 | 3/1946 | Berzer | 360/72.2 |
| 2,861,201 | 11/1958 | Yarborough | 307/225 |
| 2,888,557 | 5/1959 | Schneider | 307/225 |
| 3,993,957 | 11/1976 | Davenport | 307/225 |

Primary Examiner—Harold A. Dixon
Attorney, Agent, or Firm—Frishauf, Holtz, Goodman and Woodward

[57] ABSTRACT

A cue signal generating circuit for a tape recorder in which an audio signal and a cue signal of a lower frequency than that of the audio signal are simultaneously wherein only the cue signal is reproduced in the high speed travel of a tape to detect a recording position of the audio signal, comprises a pulse generator, a flip-flop which is normally reset and is set in response to the close of an operating means, a NAND gate which allows the output pulse signal from the pulse generator to pass therethrough in response to the set output signal from the flip-flop, a counter which counts the output signal from the NAND gate and when the count thereof reaches a prescribed value, applies an output signal to the reset terminal of the flip-flop, and a wave-shaping circuit for wave-shaping the output signal from the NAND gate and applies the wave-shaped signal to a recording head of the tape recorder.

8 Claims, 2 Drawing Figures

CUE SIGNAL GENERATING CIRCUIT

BACKGROUND OF THE INVENTION

This invention relates to a cue signal generating circuit for a recording apparatus such as a tape recorder.

In recording an audio signal, a tape recorder generally records a cue signal together with a desired audio signal for a prescribed period of time in order to rapidly detect a recorded portion of a desired audio signal. The cue signal has a very low frequency of about several tens of Hz, compared to the audio signal. Accordingly, it is not reproduced when the audio signal is reproduced. In order to detect the desired recorded portion, a playback head is in contact with a tape when the tape is caused to travel at a high speed. A tape travelling speed in a fast forward mode or a rewind mode is faster than that in the record mode by approximately several tens times. Accordingly, in the playback mode, the frequency band of the cue signal, which is much lower than the playback frequency band of the tape recorder, is increased to reproduce the cue signal. Assume now that a cue signal of 30 MHz is recorded for 10 seconds and the tape speed in the fast forward and rewind modes is 20 times that in the record mode. In this case, the cue signal is reproduced as a signal of 600 Hz for 0.5 second when the tape is caused to travel at a high speed. At the time of high speed tape travel, the frequency of the audio signal becomes excessively high and is not reproduced. By counting the number of the detections of the cue signal, a desired recorded portion is detected. A conventional cue signal generating circuit uses a one-shot multivibrator and a low frequency signal oscillator. The low frequency oscillator, which produces a sinusoidal wave signal of several Hz to several tens of Hz, is energized by a signal with a prescribed time duration produced from the multivibrator. The low frequency signal is applied as a cue signal to a recording head for a prescribed period of time. When the time constant of a multivibrator is fixed to a relatively long period of time (several seconds), it is difficult to keep and consistent the recording time of the cue signal. To provide a low frequency oscillator with stable frequency and amplitude, a number of components are required. Thus the chip size becomes large in fabricating the integrated oscillator. When the frequency of the sinusoidal wave signal is too low, the waveform of the signal is easily distorted when it is recorded, so that the merit of using the sinusoidal waveform is decreased.

SUMMARY OF THE INVENTION

An object of the invention is to provide a cue signal generating circuit which supplies a low frequency signal with a stable waveform to a recording apparatus such as a tape recorder for a prescribed time and which is suitable for an integrated circuit fabrication. It is another object to render the recording time of the cue signal always constant.

To achieve the above object, there is provided a cue signal generating circuit comprising a pulse generating circuit, a gate means which receives a pulse signal produced from the pulse generating means, a counter means which counts the pulses and which controls the gate means to render the gate means nonconductive when the count value reaches a predetermined count value, and means for converting the output signal from the gate means into a signal with a prescribed waveform.

Other objects and features of the invention will be apparent from the following description taken in connection with the accompanying drawings.

DETAILED DESCRIPTION OF THE PREFERRED EMBODIMENTS

Figure 1:
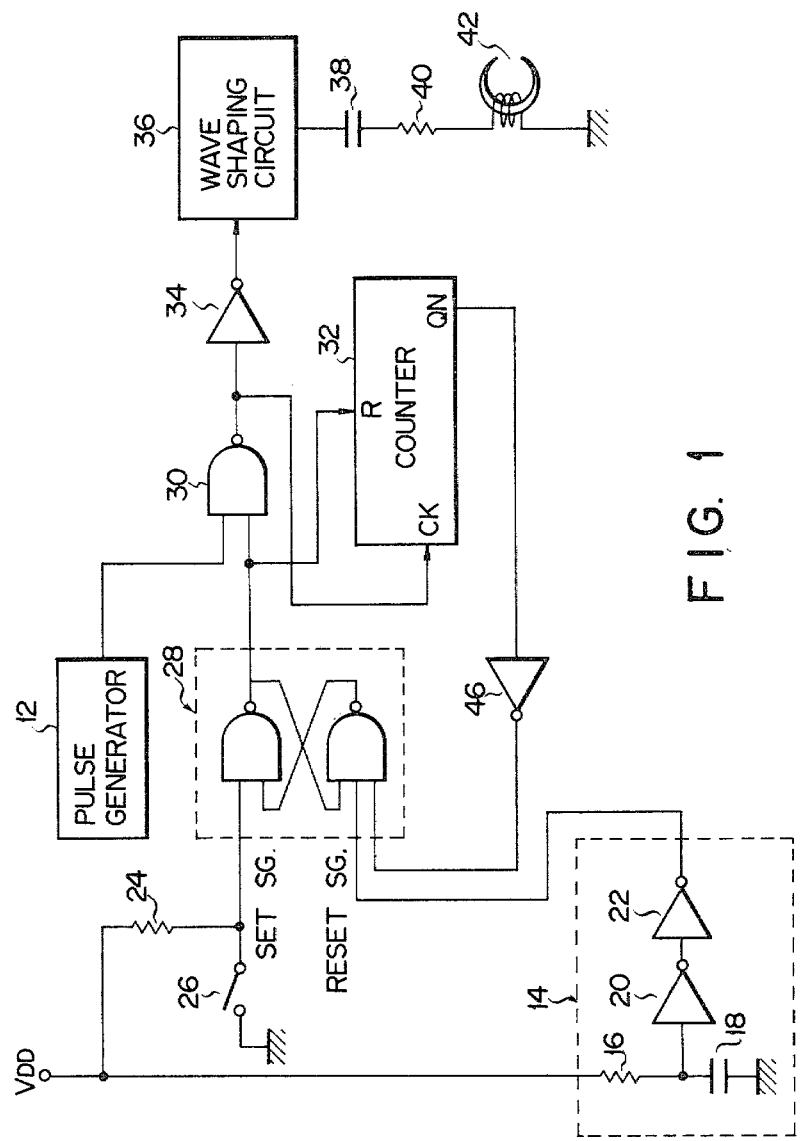
FIG. 1 is a circuit diagram of an embodiment of a cue signal generating circuit according to the invention.

Referring now to FIG. 1, there is shown an embodiment of a cue signal generating circuit according to the invention which is used for a tape recorder. As shown, a power source terminal $V_{DD}$ is connected to a clear circuit 14. The clear circuit 14 comprises a series circuit including a resistor 16 and a capacitor 18, one end of which grounded. A signal at the connection point between the resistor 16 and the capacitor 18 is led to an output terminal through a series arrangement of inverters 20 and 22. The power source terminal $V_{DD}$ is connected through a resistor 24 to one end of a switch 26 and to the set terminal of a flip-flop 28. The other end of the switch 26 is grounded. The output signal from the flip-flop 28 is applied to one input terminal of a NAND gate 30 and to a reset terminal R of an N-bit binary counter 32. A pulse generator 12 may be any suitable circuit capable of producing a pulse signal. The clock signal used for the remaining circuits of the tape recorder may be used in place of the pulse signal from the pulse generator 12, by properly frequency-dividing the clock signal and forming a rectangular wave. If a crystal oscillator is used for the pulse generator, a pulse signal with an extremely stable frequency may be obtained. An output pulse signal from the pulse generator 12 is applied to the other input terminal of the NAND gate 30. The output signal from the NAND gate 30 is applied to a clock input terminal CK of the counter 32 and through an inverter 34 to the input terminal of a wave-shaping circuit 36. Alternatively, the pulse signal from the pulse generator 12 may be directly applied to the clock terminal CK of the N-bit binary counter 32, not through the NAND gate 30. The waveshaping circuit 36 for converting a waveform (a rectangular wave in this example) into a desired waveform such as a sinusoidal waveform is comprised of an integrating circuit for converting a waveform of an input signal into a triangle wave or a non-linearity amplifying circuit for converting an input signal waveform into a pseudo-sinusoidal waveform. The output signal from the wave-shaping circuit 36 is supplied to a recording head 42, through a capacitor 38 and a resistor 40. An audio signal is also applied to the recording head (not shown) 42. Accordingly, the output signal from the wave-shaping circuit 36, together with the audio signal, is recorded on a magnetic tape. Of those output signals from the N-bit binary counter 32, the N-th bit signal is supplied through an inverter 46 to the reset terminal of the flip-flop 28. The output signal from the clear circuit 14 is also supplied to the reset terminal of the flip-flop 28.

The operation of the cue signal generating circuit thus constructed will be described. When a DC voltage is applied to the power source terminal $V_{DD}$, the output signal from the clear circuit 14 temporarily becomes low in level and then it returns to a high level. Upon turning the power on, the clear circuit 14 produces a single pulse with a low level which in turn is applied to the reset terminal of the flip-flop 28. As a result, the flip-flop 28 is reset to have an output signal of a low level. Accordingly, the NAND gate 30 has a low level at one of the input terminals thereof, so that the output signal of the NAND gate 30 is always at high level. Although the pulse signal is constantly supplied from the pulse generator 12 to the other input terminal of the NAND gate 30, the pulse signal can therefore not pass through the NAND gate 30. The output signal from the NAND gate 30 is inverted by the inverter 34 to be a signal with a low level which is in turn transferred to the input terminal of the waveshaping circuit 36. Accordingly, the waveshaping circuit 36 does not produce any output signal. At this time, the counter 32 has been reset by the output signal from the flip-flop 28.

The operation for recording the cue signal will be described. Assume now that the tape recorder is recording an audio signal. The switch 26 as an operating switch for the cue signal recording is closed when a desired audio signal is recorded. The switch 26 is a normally open switch and is made to open immediately after being closed. When the switch 26 is closed, the set terminal of the flip-flop 28 is grounded and therefore the flip-flop 28 is set. Since the output signal of a high level from the flip-flop 28 is applied to one input terminal of the NAND gate 30, the pulse signal from the pulse generator 12, which has been supplied to the other input terminal of the NAND gate 30, is inverted by the NAND gate 30. The inverted pulse signal from the NAND gate 30 is converted into a signal with a sinusoidal waveform, for example, by the waveshaping circuit 36. The sinusoidal signal, together with the audio signal, is recorded as a cue signal on the magnetic tape through the recording head 42. If the rectangular wave signal is directly recorded without the waveshaping circuit 36, it is impossible to simultaneously record the audio signal and the cue signal on the same track on the recording tape. In this case, a track exclusively used for the cue signal must be provided additionally. When the rectangular wave signal is directly recorded on the same track as that of the audio signal, the high frequency component of the rectangular wave signal distributes widely into an acoustic frequency band, even if the frequency of the rectangular wave signal is set to a relatively low level. As a result, there is a possibility that the cue signal, together with the audio signal, is reproduced as noise. Accordingly, when the waveshaping circuit 36 is provided and the rectangular wave signal is converted into a proper waveform signal, as in the above-mentioned embodiment, the frequency bands of the cue signal and the audio signal are never overlapped with each other, even if those signals are both recorded on the same track. Therefore, there is no need for any special record/playback mechanism for the cue signal and the cue signal may be recorded by using the conventional tape recorder at it is. At this time, the set output signal from the flip-flop 28 has been applied to the reset terminal R of the counter 32 and the output pulse signal from the NAND gate 30 has been applied to the clock input terminal CK of the counter 32. Therefore, the counter 32 is released from the reset state and starts its counting operation. When the counter 32 counts to $2^{N-1}$, the count output of the N-th bit becomes high in level and the count output is supplied through the inverter 46 to the reset terminal of the flip-flop 28, whereby the flip-flop 28 is reset. As a result, no pulse signal is passed through the NAND gate 30, subsequently. The counter 32 is reset by the output signal of a low level from the flip-flop 28, so that it returns to the initial state. Accordingly, the recording time of the cue signal is always kept constant by the counter 32. The remaining portion of the capacitor (not shown) necessary for the pulse generation, the capacitor 18 and the waveshaping circuit 36 may be fabricated by integrated circuit technology. The waveshaping circuit 36 may also be constructed by a simple CR lowpass filter or the like. Accordingly, the cue signal generating circuit may be realized by using only an IC chip and CR components. Therefore, space for the circuit package is saved, the cost of parts used is reduced, and the steps to fabricate the circuit is reduced. The recording time of the cue signal may be properly set in accordance with the number of bits of the counter 32.

Figure 2:
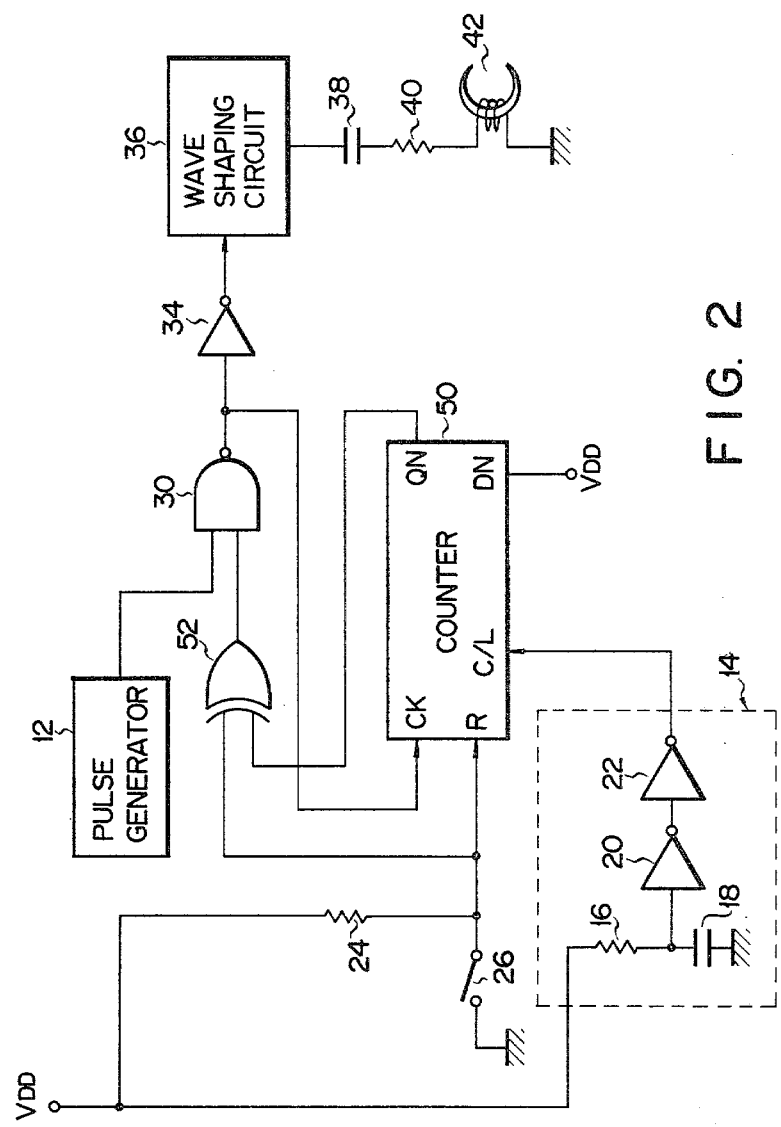
FIG. 2 is a circuit diagram of another embodiment of the cue signal generating circuit according to the invention.

Referring now to FIG. 2, there is shown a second embodiment of the cue signal generating circuit according to the invention. The like portions in the embodiment of FIG. 1 will be designated by same reference numerals for simplicity of the explanation. As shown, a power source terminal $V_{DD}$ is connected to a clear circuit 14. The output signal from the clear circuit 14 is supplied to a COUNT/LOAD terminal C/L of a N-bit presettable binary counter 50. An IC chip, for example SN 54196 manufactured by Texas Instrument Co. may be used for the N-bit presettable binary counter 50. When receiving a low level signal at the terminal C/L, the counter 50 produces the data, which has been supplied to the data input terminal thereof, irrespective of the output state of the counter thus far continued. When a high level signal is applied to the C/L terminal, the counter 50 normally operates to count the pulses supplied to the clock input terminal CK to thereby produce its count value. The power source terminal $V_{DD}$ is further connected to the N-th bit data input terminal $D_N$ of the presettable counter 50 and, through the resistor 24, to one end of the switch 26 and the reset terminal R of the presettable binary counter 50. Although not shown, the remaining bit data input terminals of the presettable counter 50 are grounded. The connection point between the resistor 24 and the switch 26 is connected to one input terminal of an exclusive OR gate 52 of which the other input terminal is connected to the count output terminal of the presettable binary counter 50. The output signal from the exclusive OR gate 52 and the pulse signal produced from a pulse generator 12 are applied to a NAND gate 30. The output signal from the NAND gate 30 is applied to the input terminal of the inverter 34 and to the clock input terminal CK of the presettable binary counter 50. As in the first embodiment, the output of the inverter 34 is supplied to the input terminal of a waveshaping circuit 36. The output signal from the waveshaping circuit 36 is supplied to a recording head 42.

In operation, when the power source is turned on, the clear circuit 14 produces a single pulse of a low level which is in turn applied to the Count/Load terminal C/L of the presettable binary counter 50. Accordingly, the counter 50 is reset to produce the data supplied to the data input terminal in an unmodified manner. Since only the data input terminal $D_N$ of the N-th bit is at a high level, a high level signal is produced from the counter output terminal $Q_N$ of the N-th bit of the counter 50, so that one input terminal of the exclusive OR gate 52 has a high level signal. Here, if the switch 26 is not closed, both the input terminals of the exclusive OR gate 52 are at a high level, the output signal from the exclusive OR gate 52 renders one input terminal of the NAND gate 30 low in level, so that the output signal from the NAND gate 30 is always high in level. Accordingly, the waveshaping circuit 36 does not yet produce an output signal at this time.

When the switch 26 is closed, the reset terminal R of the presettable binary counter 50 is grounded to be low in level, with the result that the counter 50 is reset and the output terminals thereof are all low in level. Since the switch 26 is a normally open switch, it immediately opens even if it is closed, so that the reset terminal R of the counter 50 becomes high in level. As a result, the input terminals of the exclusive OR gate 52 are low and high in level and the output signal from the exclusive OR gate 52 becomes high in level. Since one input terminal of the NAND gate 30 becomes high in level, the pulse signal produced from the pulse generator 12 is inverted by the NAND gate 30. The pulse signal, after passing through the NAND gate 30, is converted into a proper wave signal, as in the first embodiment. The wave-converted signal is recorded as a cue signal on the same track on the tape, together with the audio signal. At this time, the output pulse signal from the NAND gate 30 is supplied to the clock input terminal CK of the presettable counter 50. Accordingly, the counter 50 counts the pulse signal applied. When the counter 50 counts the pulse signal by $2^{N-1}$, the N-th bit count output terminal $Q_N$ of the counter 50 becomes again high in level, and both the input terminals of the exclusive OR circuit 52 become high in level. Therefore, the low level output signal from the exclusive OR gate 52 closes the NAND gate 30. Since the supply of the signal to the waveshaping circuit 36 is stopped, the waveshaping circuit 36 produces nothing, so that the recording of the cue signal is stopped. At this time, the N-th bit count output of the presettable binary counter 50 is high in level and thus the counter 50 stops its operation while being in the set state. Then, when the switch 26 is closed again, the abovementioned operation is repeated. As described above, the second embodiment also digitally processes the signal. Accordingly, the cue signal generator of the embodiment may easily produce a signal with a stable frequency and a waveform suitable for the cue signal for a given time. The circuit construction of the cue signal generator is suitable for IC fabrication.

What is claimed is:

1. A cue signal generating circuit comprising:
    means for generating a pulse signal;
    gate means coupled to said pulse signal generating means for selectively passing the pulse signal generated by said pulse signal generating means;
    counter means coupled to said gate means for counting the pulses of said pulse signal passed through said gate means and for controlling said gate means to be nonconductive when the count value reaches a predetermined count value; and
    waveform converting means coupled to said gate means for converting the output pulse signal from said gate means into a signal having a prescribed waveform.

2. The cue signal generating circuit of claim 1, comprising a source of an operating signal generated by an operating member to initiate recording of a cue signal;
    wherein said gate means comprises a flip-flop which is set responsive to said operating signal; and a logic gate which is supplied with a pulse signal from said pulse signal generating means, and which is rendered conductive in response to a set output signal from said flip-flop to supply said pulse signal to said waveform converting means; and
    said counter means applies a signal to the reset terminal of said flip-flop when the count value reaches said predetermined value, whereby said logic gate is rendered nonconductive so as to stop supplying said pulse signal to said waveform converting means.

3. The cue signal generating circuit of claim 1 or 2, wherein said waveform converting means comprises an integrating circuit.

4. The cue signal generating circuit of claim 1 or 2, wherein said wveform converting means comprises a non-linear amplifying circuit.

5. The cue signal generating circuit of claim 2 wherein:
    said flip-flop is reset by turning on a power source;
    said counter means counts the pulses of the output pulse signal from said logic gate and is reset by the output signal from said flip-flop when it is reset; and
    said logic gate is a NAND gate.

6. The cue signal generating circuit of claim 1,
    comprising a source of an operating signal generated by an operating member to initiate recording of a cue signal;
    wherein said counter means comprises a presettable counter for counting to a preset number and which produces a high level signal in response to the turn-on of a power source, and is reset in response to the energization of an operating member to produce a low lovel signal, and
    said gate means comprises an exclusive OR gate which is supplied with the output signal from said presettable counter and produces a high level signal in response to said operating signal; and a NAND gate which is supplied with an output pulse signal from said pulse signal generating means and is rendered conductive according to the output signal from said exclusive OR gate to supply said pulse signal from said pulse signal generating means to said presettable counter and to said waveform converting means;
    whereby when said preset number is reached by said presettable counter, said exclusive OR gate is cuased to produce an output signal to cause said NAND gate to become nonconductive and to stop supplying said pulse signal to said waveform converting means.

7. The cue signal generating circuit of claim 6, wherein said waveform converting means comprises an integrating circuit.

8. The cue signal generating circuit of claim 6, wherein said waveform converting means comprises a non-linear amplifier circuit.

* * * * *

UNITED STATES PATENT AND TRADEMARK OFFICE
CERTIFICATE OF CORRECTION

PATENT NO. : 4,338,529
DATED : July 6, 1982
INVENTOR(S) : Kenji FUJIBAYASHI

It is certified that error appears in the above-identified patent and that said Letters Patent is hereby corrected as shown below:

On the title page, abstract, line 3, after "simultaneously" insert -- recorded, and --.

COLUMN 1, line 42, after "it is difficult to" change "keep and consis-" to --keep constant and consis- --;

COLUMN 2, line 22, before "grounded." insert --is--;

COLUMN 6, line 54, change "cuased" to --caused--.

Signed and Sealed this

Twenth-eighth Day of September 1982

[SEAL]

Attest:

GERALD J. MOSSINGHOFF

*Attesting Officer*  *Commissioner of Patents and Trademarks*